US009465468B2

(12) United States Patent
Lee et al.

(10) Patent No.: US 9,465,468 B2
(45) Date of Patent: Oct. 11, 2016

(54) MOBILE TERMINAL AND CONTROLLING METHOD THEREOF

(71) Applicant: LG ELECTRONICS INC., Seoul (KR)

(72) Inventors: Seungmin Lee, Seoul (KR); Dongog Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 14/591,770

(22) Filed: Jan. 7, 2015

(65) Prior Publication Data

US 2015/0194186 A1 Jul. 9, 2015

(30) Foreign Application Priority Data

Jan. 8, 2014 (KR) .................. 10-2014-0002185

(51) Int. Cl.
| | | |
|---|---|---|
| G11B 27/00 | (2006.01) |
| G06F 3/041 | (2006.01) |
| H04N 5/77 | (2006.01) |
| G11B 27/031 | (2006.01) |
| G11B 27/34 | (2006.01) |
| H04N 9/82 | (2006.01) |
| H04N 5/232 | (2006.01) |

(52) U.S. Cl.
CPC ............. *G06F 3/041* (2013.01); *G11B 27/031* (2013.01); *G11B 27/34* (2013.01); *H04N 5/772* (2013.01); *H04N 9/8227* (2013.01); *H04N 5/23293* (2013.01)

(58) Field of Classification Search
CPC ........................... G11B 27/34; G11B 2220/90
USPC ................................. 386/278, 282, 286, 287
See application file for complete search history.

(56) References Cited

U.S. PATENT DOCUMENTS

| | | | |
|---|---|---|---|
| 8,577,201 B2* | 11/2013 | Kaminski ................ H04N 5/76 386/235 |
| 2002/0012050 A1* | 1/2002 | Oka ...................... H04N 5/2252 348/211.99 |
| 2002/0174430 A1* | 11/2002 | Ellis ..................... G11B 27/005 725/46 |
| 2003/0110514 A1* | 6/2003 | West ........................ H04N 5/76 725/134 |
| 2009/0132075 A1* | 5/2009 | Barry ................... G11B 27/031 700/94 |
| 2010/0262913 A1* | 10/2010 | Takagi ................. G11B 27/034 715/723 |
| 2012/0056828 A1* | 3/2012 | Miyazaki ............ G06F 3/04883 345/173 |
| 2012/0210221 A1* | 8/2012 | Khan ................... G11B 27/034 715/716 |
| 2013/0208143 A1* | 8/2013 | Chou ..................... H04N 1/212 348/231.99 |
| 2014/0169765 A1* | 6/2014 | Wang ....................... H04N 9/79 386/280 |

\* cited by examiner

*Primary Examiner* — Thai Tran
*Assistant Examiner* — Mishawn Hunter
(74) *Attorney, Agent, or Firm* — Birch, Stewart, Kolasch & Birch, LLP

(57) ABSTRACT

A mobile terminal including a camera; a touchscreen; and a controller configured to start recording a video through the camera, display an editing region on the currently recording video including a time axis for a previously recorded part of the currently recording video and a plurality of thumbnail images listed on the time axis, receive an input of selecting a first point in the editing region for selecting a first portion of the previously recorded part while the video is currently being recorded, and overwrite the first portion of the previously recorded part with video currently being recorded.

17 Claims, 18 Drawing Sheets

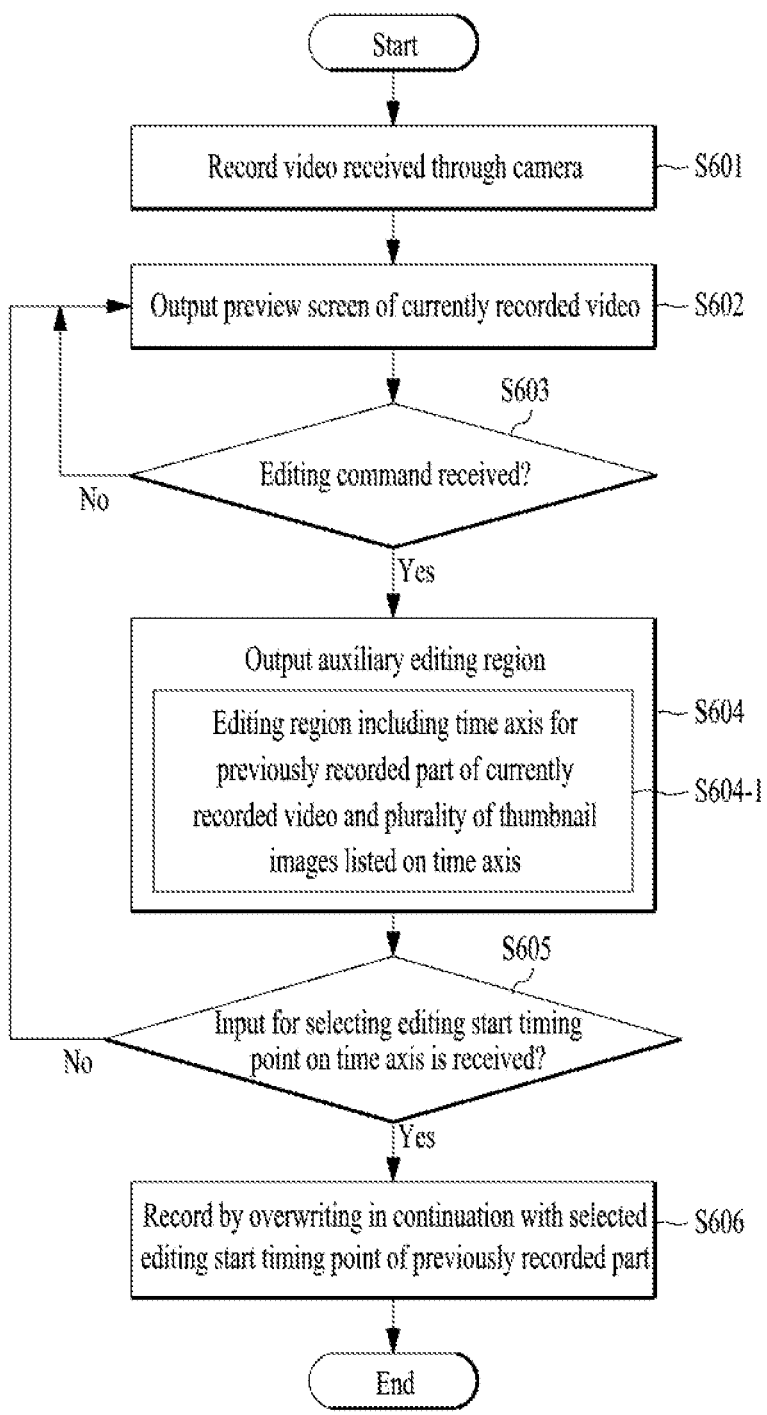

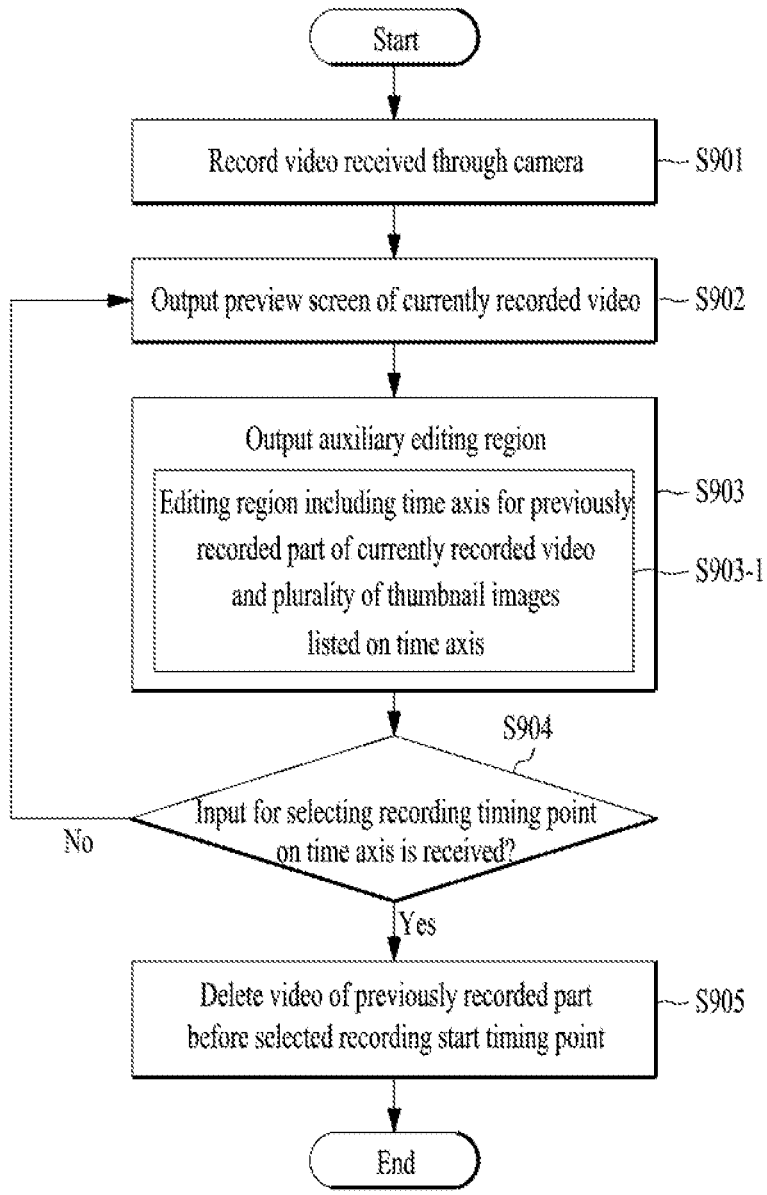

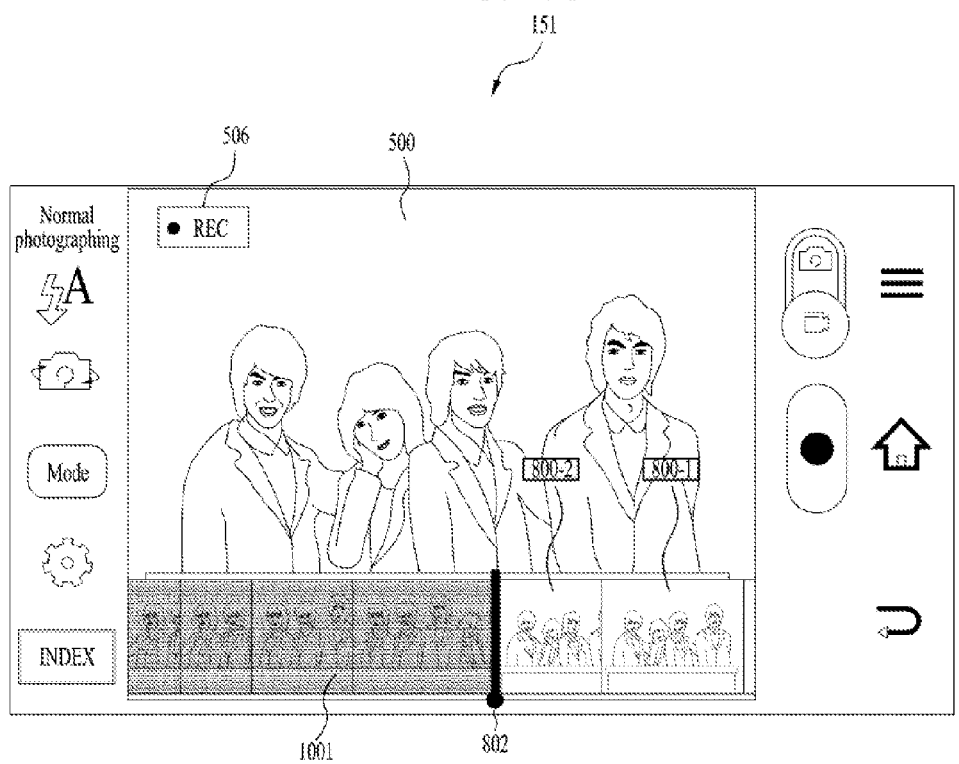

MOBILE TERMINAL AND CONTROLLING METHOD THEREOF

Pursuant to 35 U.S.C. §119(a), this application claims the benefit of earlier filing date and right of priority to Korean Application No. 10-2014-0002185, filed on Jan. 8, 2014, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof.

2. Discussion of the Related Art

A mobile terminal can perform various functions including data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. In addition, the mobile terminals can be further classified into handheld terminals and vehicle mounted terminals.

In addition, each multimedia device equipped with complex functions has become a content creation tool. Users of mobile terminals record videos of events or user created contents (UCC) and then share them with other people. However, the user generally has to edit the recorded videos or images before the contents are shared. In addition, it is difficult to edit videos in the related mobile terminal.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a currently recorded video can be edited on recording a video.

To achieve these objects and other advantages and in accordance with the purpose of the invention, as embodied and broadly described herein, the present invention provides in one aspect a mobile terminal including a camera, a touchscreen, and a controller outputting a preview screen of a video received through the camera, the controller recording the video, the controller outputting an editing region including a time axis for a previously recorded part of the currently recorded video and a plurality of thumbnail images listed on the time axis, the controller, if receiving an input of selecting a first point in the editing region, performing a recording by overwriting a video at a second timing point behind a first timing point in continuation with the first timing point corresponding to the selected first point.

Preferably, the controller may control time intervals between the thumbnail images adjacent to each other among a plurality of the thumbnail images listed on the time axis to be outputted by being distinguished from each other in at least two kinds of different time intervals.

Preferably, if a touch to a second point on the time axis is received, the controller may further output the thumbnail image for a timing point corresponding to the second point.

Preferably, the second timing point may include a timing point based on at least one of a timing point of outputting the editing region initially, a timing point of selecting the first point, and a timing point of starting to control the recording by overwriting the video.

Preferably, if a touch to the first point on the time axis is received, the controller may control the thumbnail image corresponding to a timing point ahead of a timing point corresponding to the first point and the thumbnail image corresponding to a timing point behind the timing point corresponding to the first point to be outputted in a manner of being distinguished from each other.

In another aspect of the present invention, as embodied and broadly described herein, a mobile terminal according to an embodiment of the present invention may include a camera, a touchscreen, and a controller outputting a preview screen of a video received through the camera, the controller recording the video, the controller outputting an editing region including a time axis for a previously recorded part of the currently recorded video and a plurality of thumbnail images listed on the time axis, the controller, if receiving an input of selecting a first point in the editing region, deleting the video before a timing point corresponding to the selected first point.

Preferably, the controller may control time intervals between the thumbnail images adjacent to each other among a plurality of the thumbnail images listed on the time axis to be outputted by being distinguished from each other in at least two kinds of different time intervals.

Preferably, if a touch to a second point on the time axis is received, the controller may further output the thumbnail image for a timing point corresponding to the second point.

More preferably, the at least two kinds of the different time intervals may include a first time interval and a second time interval behind a recording start timing point from a recording start timing point and the $1^{st}$ time interval may be longer than the second time interval.

Preferably, if a touch to the first point on the time axis is received, the controller may control the thumbnail image corresponding to a timing point ahead of a timing point corresponding to the first point and the thumbnail image corresponding to a timing point behind the timing point corresponding to the first point to be outputted in a manner of being distinguished from each other. The present invention also provides corresponding methods of controlling the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 6 is a flowchart of a controlling method of editing a video part previously recorded on recording according to a first embodiment of the present invention;

FIG. 9 is a flowchart of a controlling method of editing a video part previously recorded on recording according to a second embodiment of the present invention;

FIG. 10A, FIG. 10B and FIG. 10C are diagrams illustrating a controlling method of editing a previously recorded video on recording according to a second embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the invention only. Therefore, significant meanings or roles are not given to the suffixes themselves and it is understood that the 'module', 'unit' and 'part' can be used together or interchangeably. The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
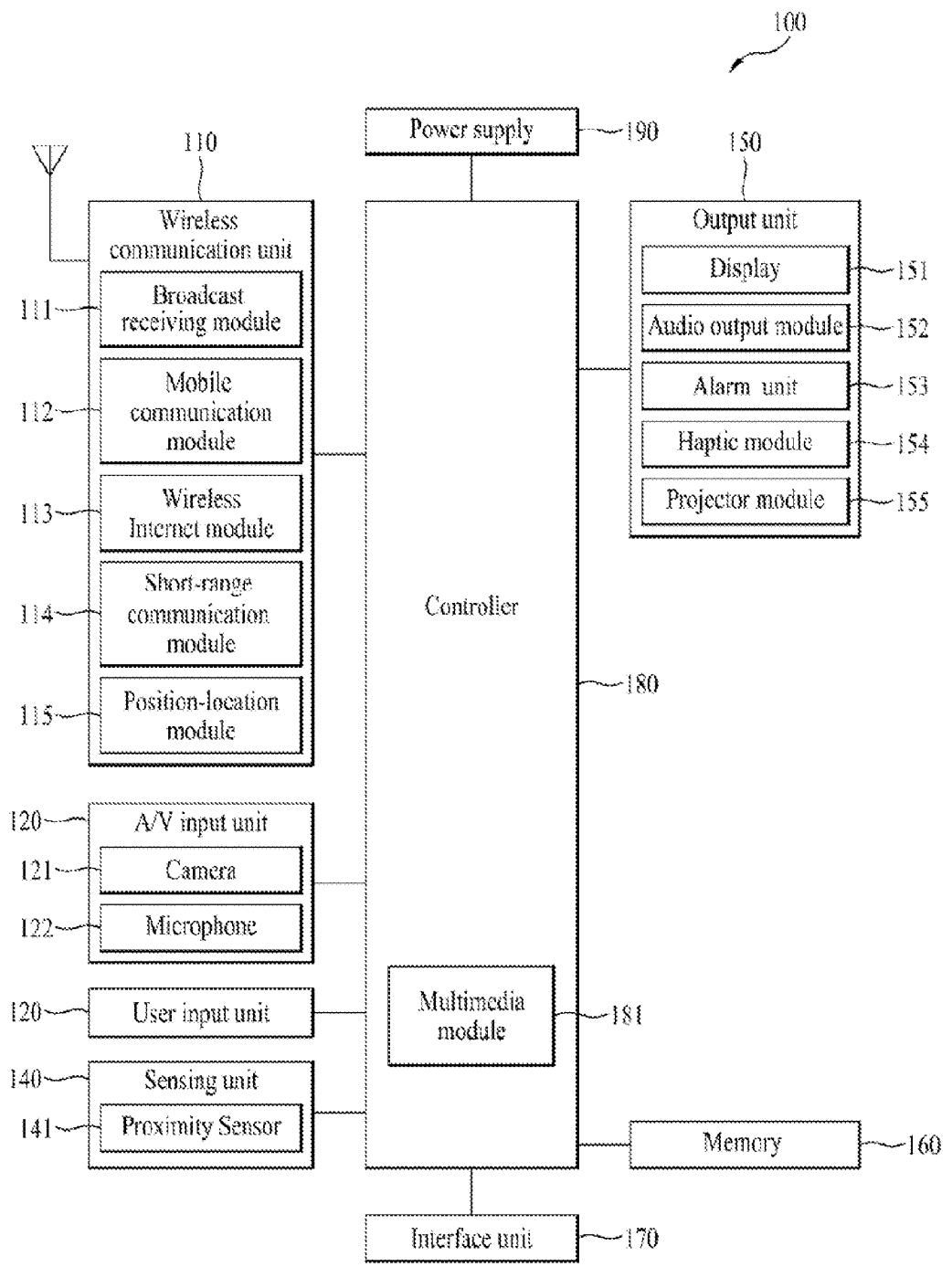
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but all of the illustrated components is not a requirement. Greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation. The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112. The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160. The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceiving, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated during receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. The touch sensor can detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1, the proximity sensor 141 can be provided to an internal area of the mobile terminal 100 enclosed by the touchscreen or around the touchscreen. The proximity sensor 141 can detect a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
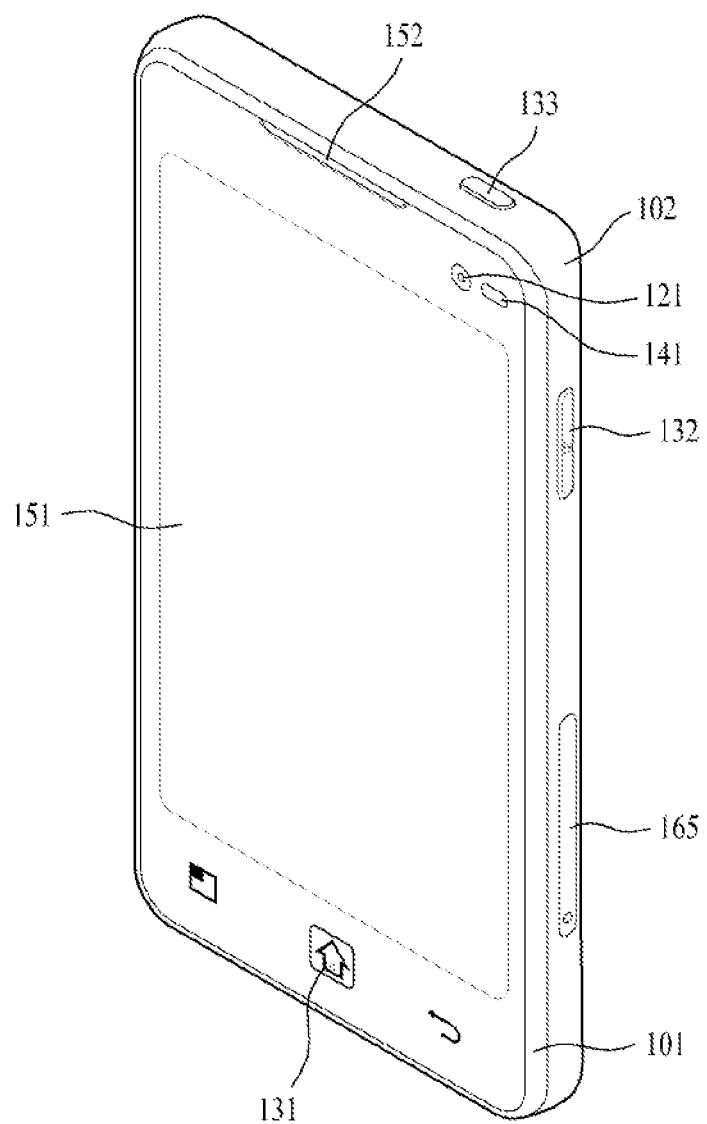
FIG. 2 is a front perspective diagram illustrating one example of a mobile or portable terminal according to an embodiment of the present invention.

FIG. 2 is a front perspective diagram of a mobile terminal according to one embodiment of the present invention. The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101. The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 3:
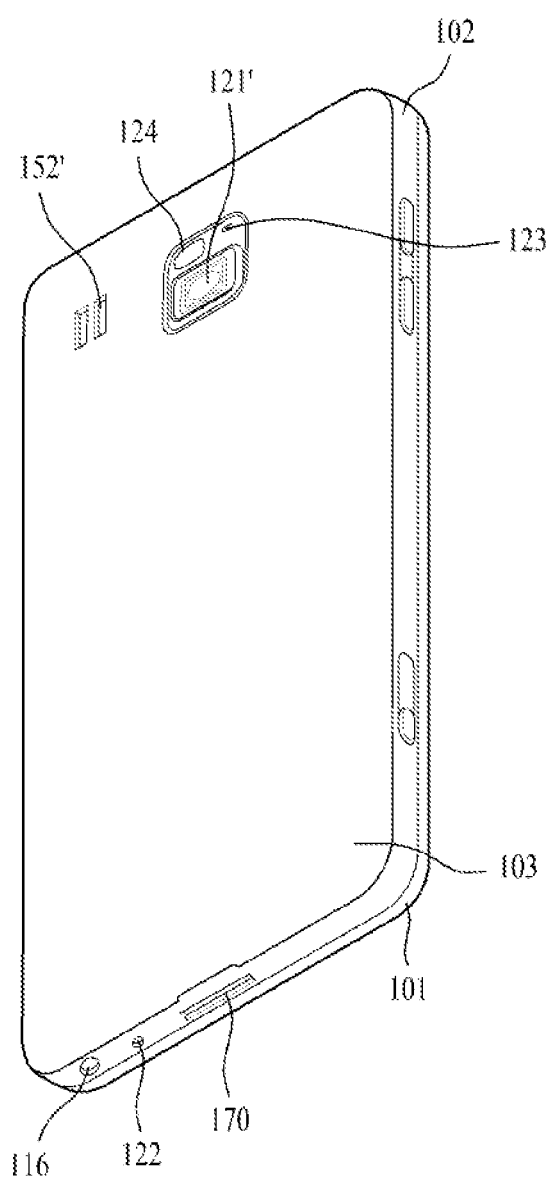
FIG. 3 is a rear perspective diagram of the mobile terminal shown in FIG. 2.

FIG. 3 is a perspective diagram of a backside of the terminal shown in FIG. 2. Referring to FIG. 3, a camera 121' can be additionally provided to a backside of the terminal body, and more particularly, to the rear case 102. The camera 121 has a photographing direction that is substantially opposite to that of the camera 121 shown in FIG. 2 and may have pixels differing from those of the camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
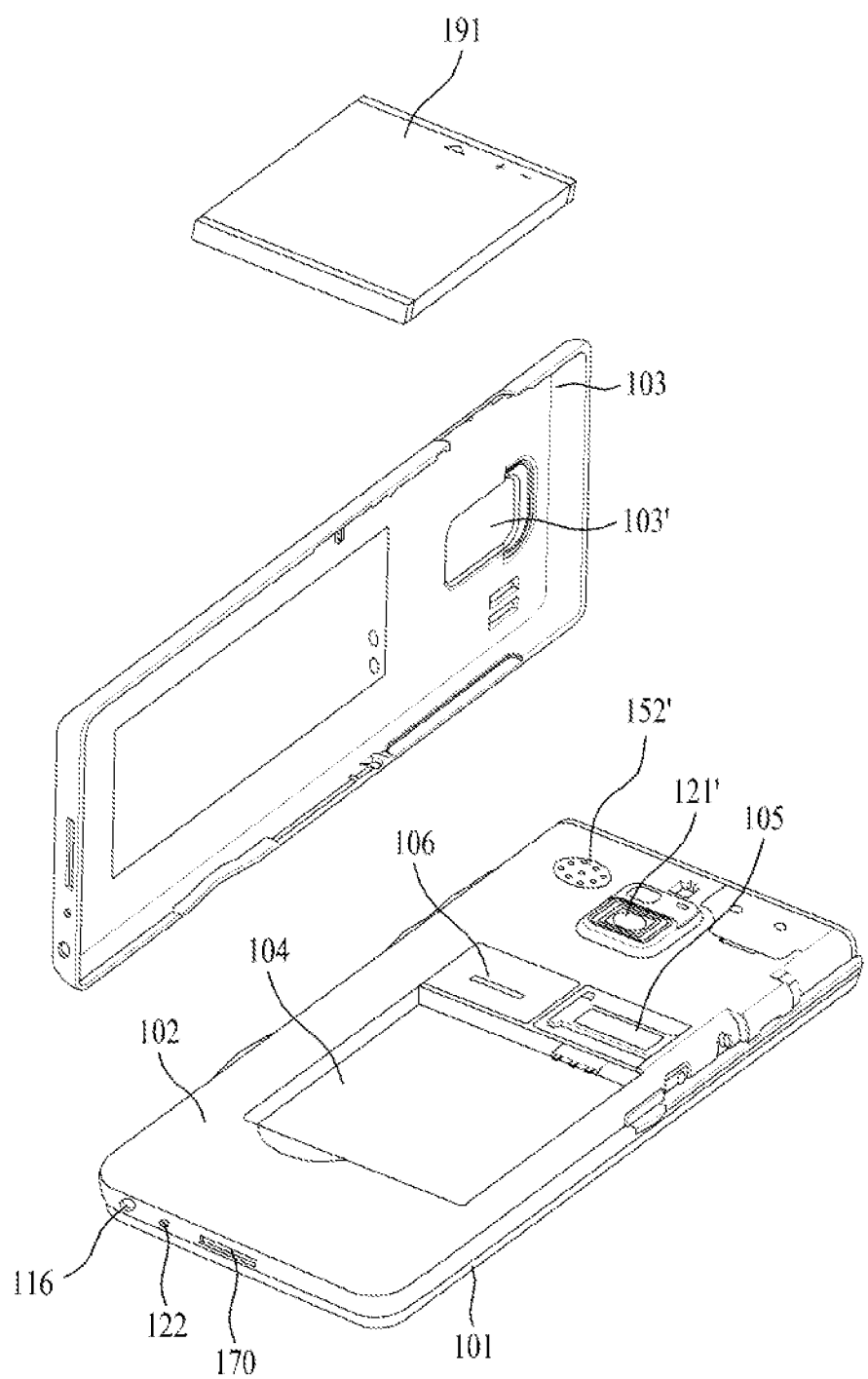
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention. Referring to FIG. 4, a front case 101, a rear case 102, a rear cover (or a battery cover) 103, a camera 121', an interface unit 170, a microphone 122, an audio output unit 152', a battery 191, a battery loading unit 104, a USIM card loading unit 105, and a memory card loading unit 106 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. When the replaceable type is adopted, the battery loading unit 104 is formed on the surface of the rear case 102 to enable a user to detach the corresponding battery. In this instance, a contact terminal is provided to the battery loading unit 104 to be electrically connected to a part installed within the case.

The USIM card loading unit 105 or the memory card loading unit 106 may be provided, as shown in FIG. 4, next to the battery loading unit 104. Alternatively, the USIM card loading unit 105 or the memory card loading unit 106 may be provided to a bottom surface of the battery loading unit 104. Hence, the battery 191 can be externally exposed if the battery 191 is unloaded from the battery loading unit 104. In this instance, since a size of the battery loading unit 104 is extensible, the battery 191 can be oversized.

Although FIG. 4 shows the configuration that the USIM card loading unit 105 or the memory card loading unit 106 is mounted on a backside of the rear case 102, it can be inserted in or separated from the mobile terminal 100 by being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103.

According to one embodiment, the present invention provides a controlling method of conveniently editing a previously recorded portion of a currently recorded video while recording the video. In particular, FIG. 5 is a diagram of a recording screen according to one embodiment of the present invention.

Figure 5:
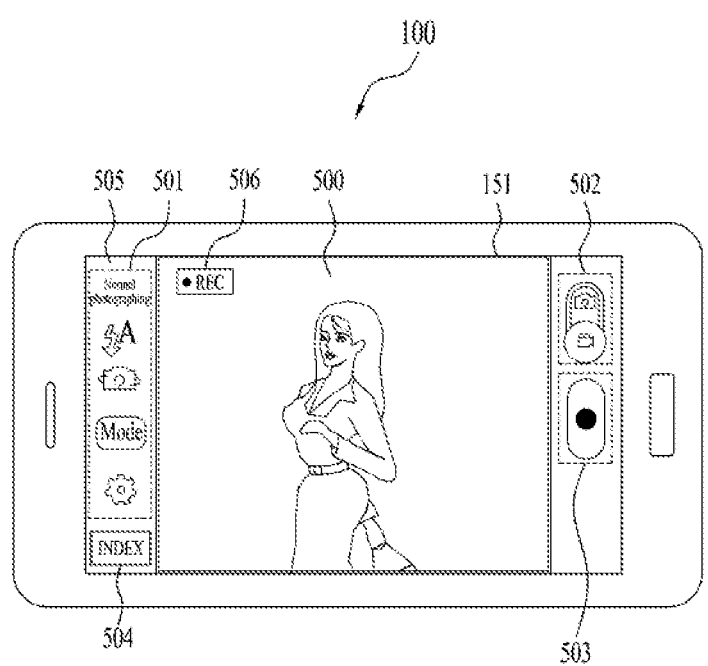
FIG. 5 is a diagram of a recording screen according to one embodiment of the present invention.

Referring to FIG. 5, the controller 180 displays a recording screen 505 on the touchscreen 151. Further, the recording screen 505 may include a preview screen 500, a setting menu 501, a switching button 502, a record button 503, an index insertion button 504 and a recording indicator 506.

The preview screen 500 outputs a preview of a currently recorded video. The setting menu 501 includes various setting icons required for a recording. For instance, when a recording is performed, the setting menu 501 can include a setting icon for determining whether to activate a flash, a setting icon for determining whether to use a front camera or a rear camera, and the like.

The switching button 502 is for switching a photo taking operation and a video recording operation to each other. The record button 503 is for starting or stopping a recording. In particular, if the record button 503 is selected by a user, the controller 180 starts the recording. If the record button 503 is selected again during the recording, the controller 180 can stop the recording.

The index insertion button 504 is for inserting an index corresponding to a prescribed timing point of a previously recorded video during the recording according to one embodiment of the present invention. The index insertion button 504 will be described in detail with reference to FIG. 13 later. The recording indicator 506 indicates that a recording is in progress. If the recording is in progress, the controller 180 can display the recording indicator 506 together with a preview.

Next, FIG. 6 is a flowchart of a controlling method of editing a video part previously recorded according to a first embodiment of the present invention. In addition, FIGS. 7A to 7D are diagrams illustrating a controlling method of editing a previously recorded video while recording according to the first embodiment of the present invention.

First of all, when a video is recorded, an undesired content may be inserted in part or it may be necessary for the video to be recorded again due to an actor's NG (no good). Yet, if a considerable amount of a video is already recorded, it is inconvenient to film a video from the beginning. In order to prevent such inconvenience, the following editing method may be used. First of all, a new video is filmed from a timing point of the NG occurrence, and a prescribed portion of a previously recorded video is cut out and then attached to the newly filmed video continuously.

However, the above-mentioned editing work is not always convenient. The reason for this is described as follows. First of all, the filmed video is fully played. Secondly, the NG occurring timing point has to be discovered from the currently played video. Moreover, after start and end points of the NG occurring portion in the currently played video have been specified and cut, the rest of the video has to be saved again. Accordingly, one embodiment of the present invention provides a method of editing a video while recording the video instead of editing the video after saving the corresponding video.

Figure 7A:
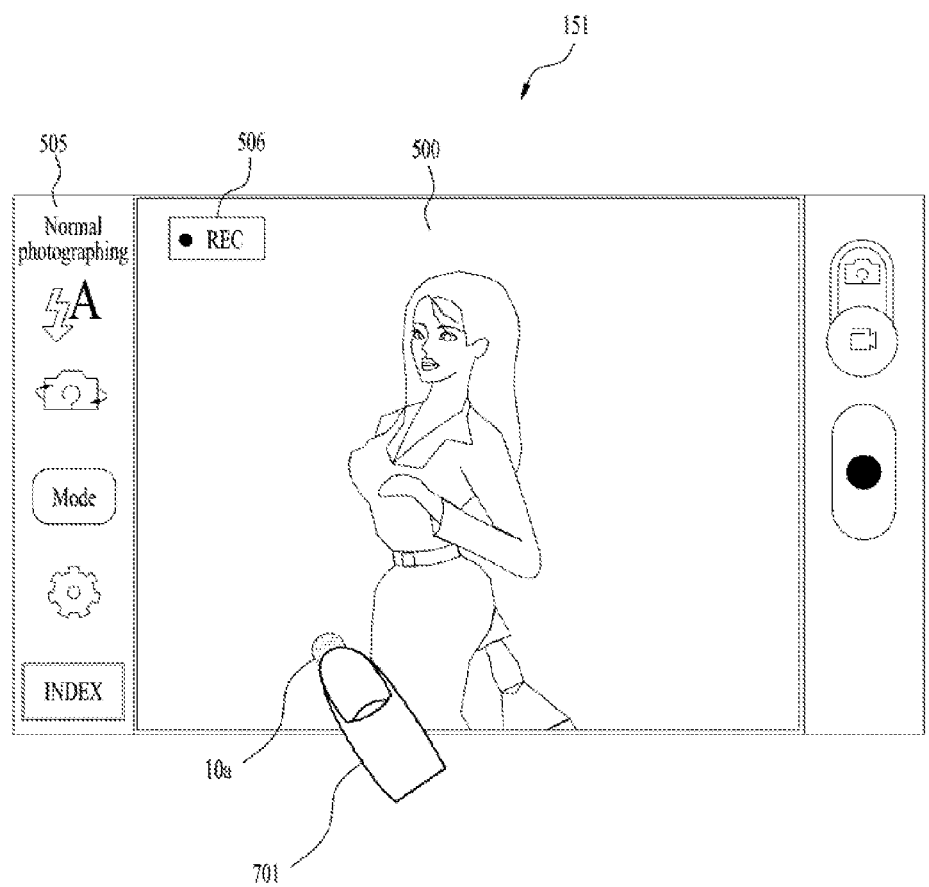
FIGS. 7A to 7D are diagrams illustrating a controlling method of editing a previously recorded video on recording according to a first embodiment of the present invention.
Figure 7B:
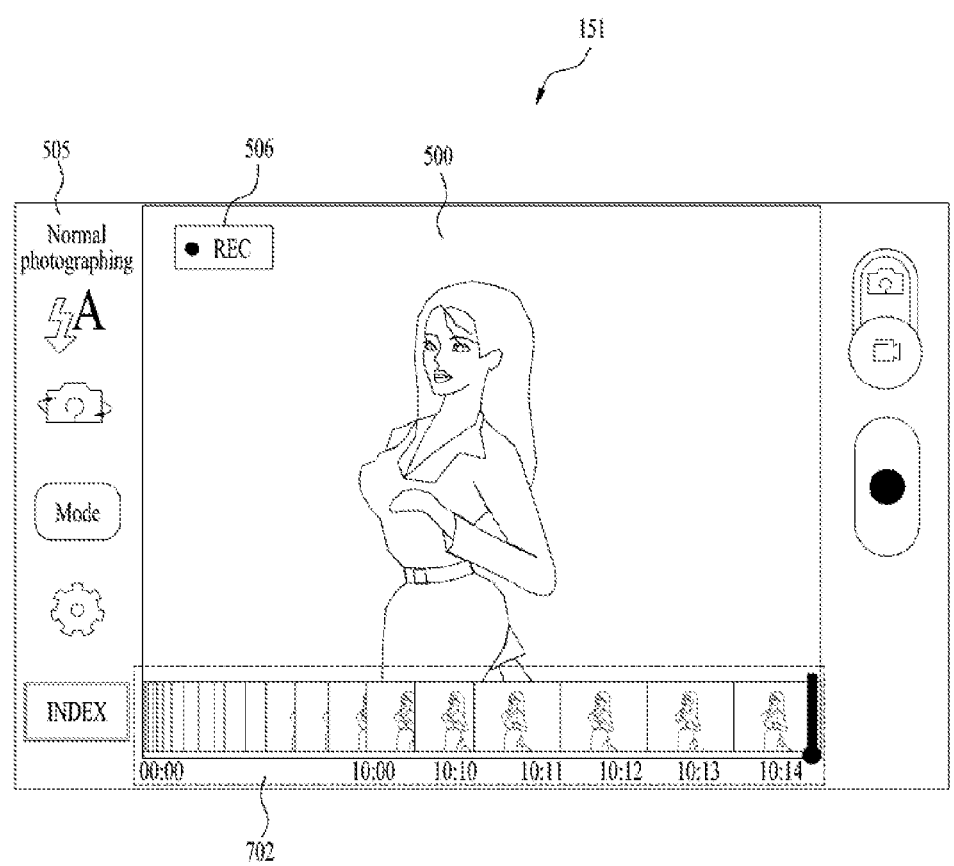
Figure 7C:
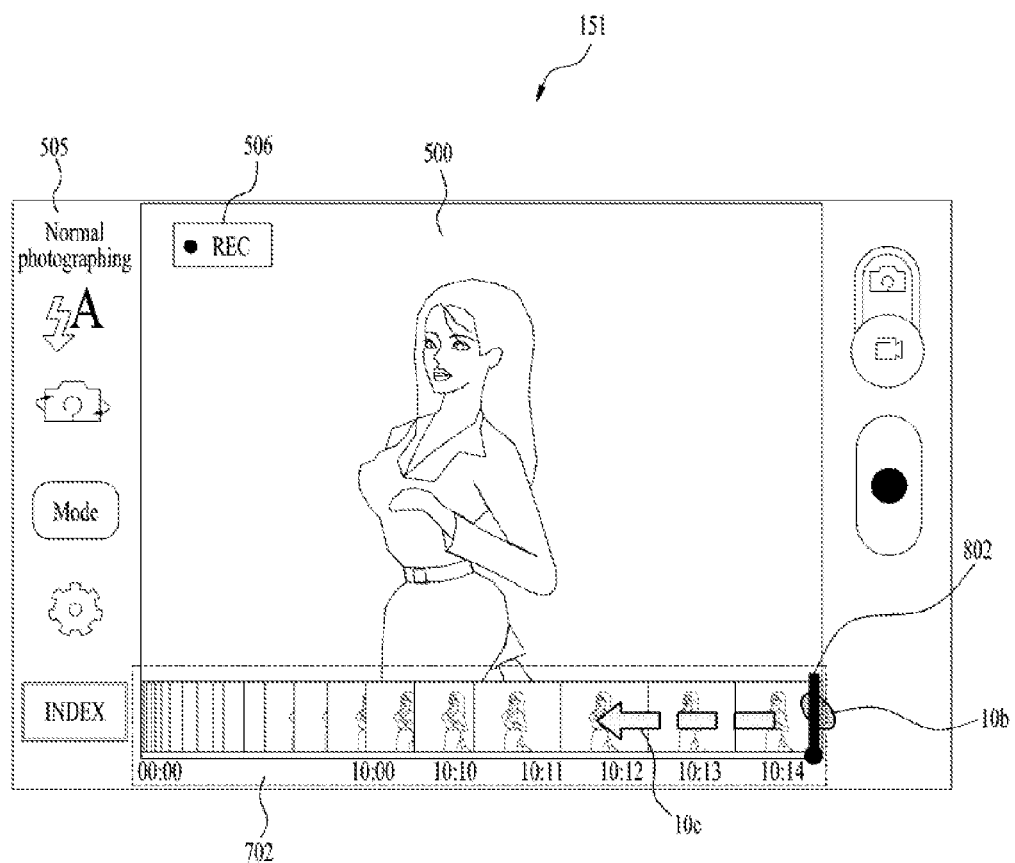
Figure 7D:
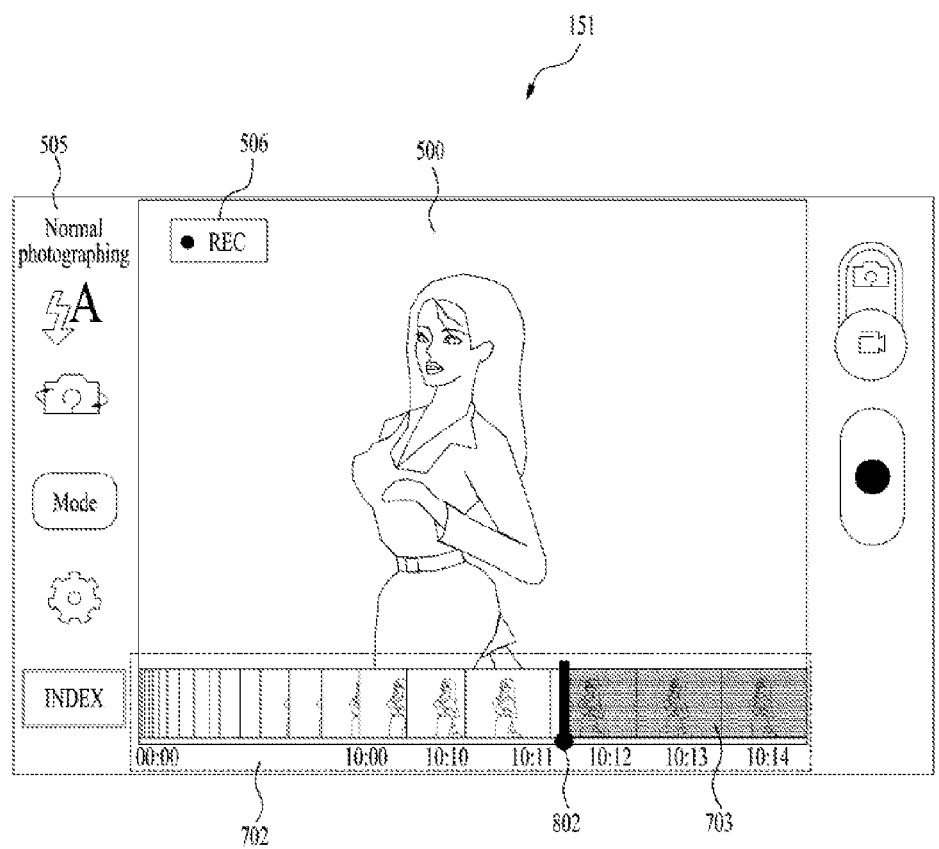

Referring to FIGS. 6 to 7D, the controller 180 records a video received through the camera 121 (S601). Then, the controller 180 outputs a preview screen 500 included in a recording screen 505 (S602). Further, the controller 180 can display a recording indicator 506, which indicates that a recording is in progress, together with the preview screen 500.

According to one embodiment of the present invention, if an editing command is received, the controller 180 outputs an auxiliary editing region 702. In particular, the controller 180 stands by for a reception of an editing command from a user (S603). If the editing command is received, the routine proceeds to step S604. Otherwise, the routine returns to the step S602. According to one embodiment of the present invention, referring to FIG. 7A, the editing command may include an input of a touch 10*a* to a prescribed region of the preview screen 500. In this instance, the prescribed region may include a specific region located at a bottom end of the preview screen 500. A user's finger (or an object) 701 for the input of the touch 10*a* to the prescribed region shall be omitted from the following drawings.

In the step S604, referring to FIG. 7B, the controller 180 outputs an auxiliary editing region 702. In this instance, the auxiliary editing region is an assistant region provided to a user in order to edit a previously recorded video. The auxiliary editing region 702 may include a time axis for a previously recorded portion of a currently recorded video and a plurality of thumbnail images listed on the time axis. The auxiliary editing region 702 will now be described in detail with reference to FIG. 8A and FIG. 8B (FIGS. 7C and 7D will be discussed in more detail after the discussion of FIGS. 8A and 8B).

Figure 8A:
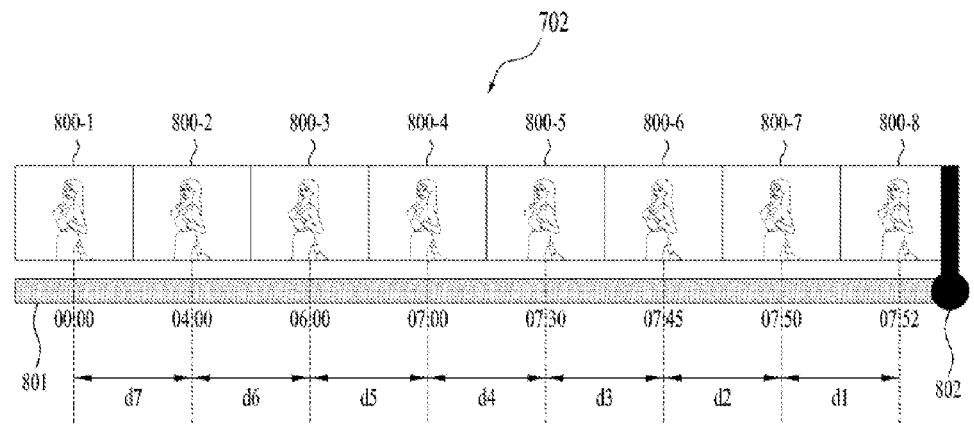
FIG. 8A and FIG. 8B are diagrams illustrating examples of a displayed auxiliary editing region 702 according to one embodiment of the present invention.
Figure 8B:
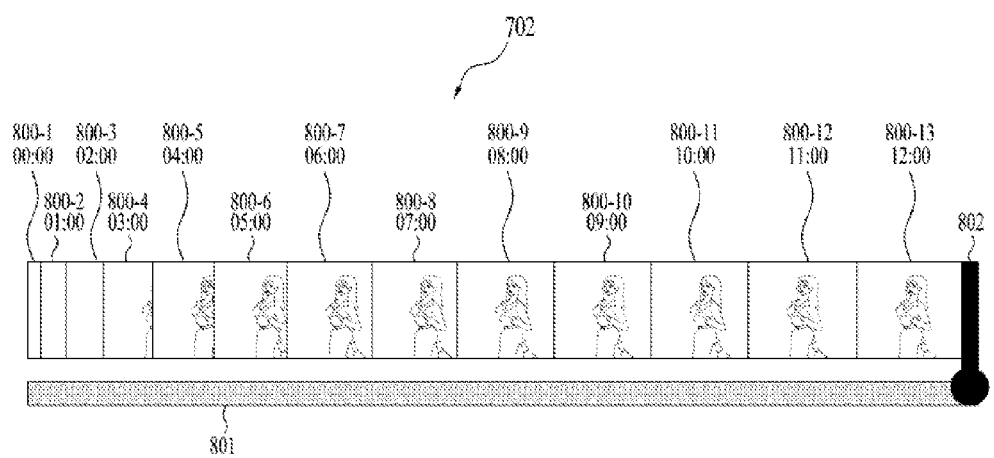

In particular, FIG. 8A and FIG. 8B are diagrams illustrating examples of the auxiliary editing region 702 displayed according to one embodiment of the present invention. For example, the auxiliary editing region 702 receives an input of a precise timing point for an editing from a user. In addition, the auxiliary editing region 702 includes a time axis 801 for a previously recorded portion of a currently recorded video and a plurality of thumbnail images 800-1, 800-2 . . . listed on the corresponding time axis 801.

Further, a thumbnail image at a prescribed timing point is displayed at a corresponding position. In particular, a thumbnail image arranged at a prescribed position on a time axis is an image at a timing point corresponding to the prescribed position. The auxiliary editing region 702 may include a timing point indicator 802 for receiving an input of an editing start timing point from a user.

Thus, an editing environment available while recording or playing a video is provided. Hence, in order to receive an input of a precise editing timing point from the user, minimum information on the editing timing point is preferably provided to the user. According to embodiments of the present invention, a thumbnail image is provided as the minimum information.

A user can check a preview of a video at a corresponding timing point on a time axis through a thumbnail image by looking at a plurality of thumbnail images provided along the time axis. For instance, assuming that an interruption of a specific obstacle interrupts a recording, the user can check a timing point at which the specific obstacle has interrupted. Hence, the mobile terminal 100 can provide a user with an editing required detailed timing point through a thumbnail image.

In addition, since the auxiliary editing region 702 is provided during recording of a video, the number of the displayed thumbnail images is limited inevitably due to a size of the display (or touchscreen) 151. If a previously recorded amount increases, the number of the required thumbnail images increases as well. However, it may not be possible satisfy the required number of the thumbnail images. Therefore, according to one embodiment of the present invention, a time interval and/or a distance interval between thumbnail images displayed on a time axis is adjusted.

In the following description, the auxiliary editing region 702 for adjusting the time interval is described in detail with reference to FIG. 8A. In this instance, the time interval corresponds to a time interval between adjacent thumbnail images. Generally, if a user recognizes an occurrence of NG, the user directly inputs an editing command. Hence, a timing point at which a user desired to perform an editing may not be so distant from a timing point at which the editing command is input. Therefore, according to an embodiment of the present invention, a time interval between thumbnail images for a start part of a recording is relatively large. In addition, the corresponding time interval decreases toward a timing point at which an editing command is received.

The example shown in FIG. 8A is described in detail as follows. Referring to FIG. 8A, a time axis 801 and 8 thumbnail images 800-1 to 800-8 are illustrated. Intervals between thumbnail images adjacent to each other among the 8 thumbnail images 800-1 to 800-8 are denoted by d1 to d7, respectively. In addition, the detailed intervals are shown in Table 1.

TABLE 1

| Text | Time interval (seconds (s)) |
| --- | --- |
| d1 | 2 |
| d2 | 5 |
| d3 | 15 |
| d4 | 30 |
| d5 | 60 |
| d6 | 120 |
| d7 | 240 |

The interval approaches a recording start timing point in a direction from d1 to d7 and its value increases gradually. In particular, the controller 180 can control the time interval between the thumbnail images, which are adjacent to each other among the thumbnail images displayed on the time axis, to increase gradually toward the recording start timing point.

The time interval adjustment is not limited by the above-described embodiment. For instance, a previously recorded video is divided into a plurality of sections and time intervals for a plurality of the sections can be set different from each other. In particular, in the previously recorded video, one thumbnail image is displayed on a first section in a first time interval, another thumbnail image is displayed on a second section in a second time interval, and the like. For example, in a previously recorded video amounting to 8 minutes, a thumbnail image having a time interval of 1 minute is displayed for a video section corresponding to 0~4 minute and a thumbnail image having a time interval of 30 seconds is displayed for a video section corresponding to 4~8 minutes.

Figure 13:
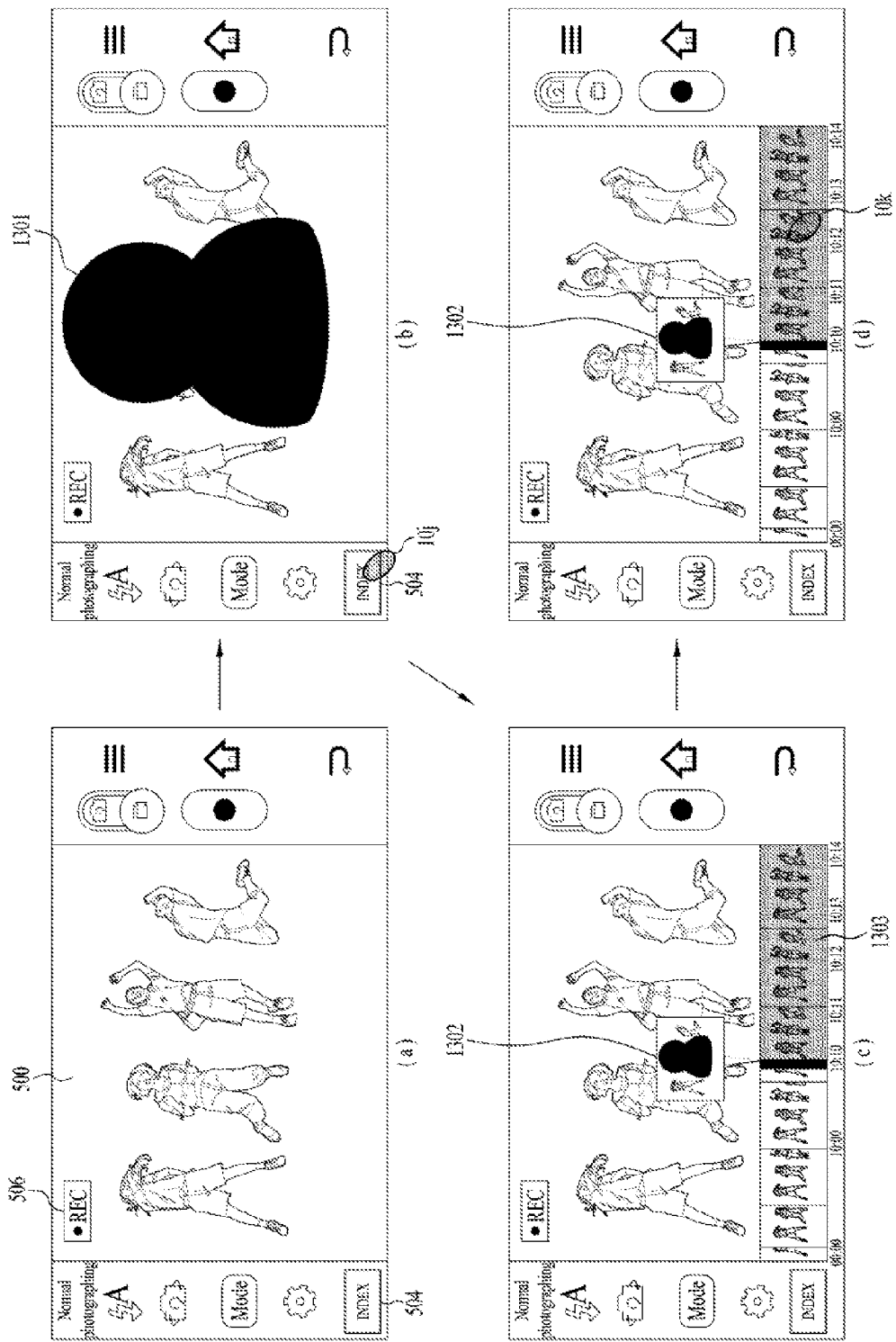
FIG. 13 is a diagram illustrating a controlling method of displaying an index timing point at a prescribed point on a time axis according to one embodiment of the present invention.

The auxiliary editing region 702 for adjusting the distance interval is described in detail with reference to FIG. 8B as follows. In this instance, the distance interval corresponds to an interval between positions at which thumbnail images adjacent to each other are displayed, respectively. Referring to FIG. 8B, 13 thumbnail images 800-1 to 800-13 are displayed on a time axis 801.

Each time interval between the displayed thumbnail images is set identically and the time axis 801 proceeds in a left-to-right direction. A position interval between the thumbnail images displayed on the time axis 801 gradually decreases toward a recording start timing point. For example, the closer an editing command received timing point approaches, the wider a position interval between thumbnail images becomes.

Referring again to FIG. 6 and FIG. 7, the controller 180 receives an input of selecting an editing start point on the output auxiliary editing region 702 from a user (S605). The selection of the editing start point may be performed on the time axis 801 or a plurality of the thumbnail images 800-1, 800-2 . . . displayed on the auxiliary editing region 702 described with reference to FIG. 8A or FIG. 8B. For instance, if a prescribed point on the time axis 801 is selected by a user, a timing point corresponding to the selected prescribed point can be input as the editing start timing point. Alternatively, in order to select an editing start point, a user can use the timing point indicator 802 shown in FIG. 8A or FIG. 8B.

Referring to FIG. 7C, the mobile terminal 100 receives an input for shifting the timing point indicator 802 and FIG. 7D shows that the timing point indicator 802 has been shifted. The input for shifting the timing point indicator 802 may include an input performed by applying a touch 10b to the timing point indicator 802 and then applying a drag 10c to a desired position on the time axis by maintaining the touch 10b. The above-described input for shifting the timing point indicator 802 is just exemplary, by which the present embodiment is non-limited.

According to one embodiment of the present invention, for instance, an input for selecting an editing start timing point may include an input for shifting the timing point indicator 802 to a prescribed position on the time axis. If the timing point indicator 802 is received, the controller 180 can determine a timing point corresponding to the shifted prescribed position as an editing start timing point. In this instance, if the input for selecting an editing start timing point or the input for shifting the timing point indicator 802 is located on a specific thumbnail image, the controller 180 switches the preview screen 500 to a screen corresponding to the specific thumbnail image and may then display the switched screen.

Referring to FIG. 7D, the controller 180 can control the thumbnail images, which are located on the right side of the timing point indicator 802, to be identifiably displayed with a visual effect 703. In the step S605, if the editing start timing point is not received, the controller 180 can return to the step S602. In the step S605, if the editing start timing point is received, the controller 180 can go to a step S606.

In the step S606, the controller 180 can perform a recording in continuation with the selected editing start timing point of the previously recorded part by overwriting. The editing command and the editing start timing point are received from a user during the recording. Hence, the recording may be in progress the moment the editing command and the editing start timing point are received. Since the recording is in progress, the recorded images may be consecutively added to the previously recorded part. The video of the previously recorded part before the editing start timing point received from the user may correspond to the video before the occurrence of the NG.

In addition, the video after the editing start timing point may correspond to the NO occurring video. Hence, according to one embodiment of the present invention, the video after the editing start timing point is removed from the previously recorded part. Thus, the controller 180 keeps the video of the previously recorded part before the editing start timing point and controls newly recorded images to be saved in continuation with the editing start timing point. Moreover, in order to simultaneously perform both an operation of the removal and an operation of the continuous saving, the controller 180 can perform the recording in continuation with the selected editing start timing point of the previously recorded part by overwriting.

In this instance, a different timing point connected to the selected editing start timing point of the previously recorded part may be associated with an editing timing point or an editing applied timing point. For instance, the different timing point connected to the selected editing start timing point of the previously recorded part may include a timing point from which an editing connected to the selected editing start timing point of the previously recorded part starts actually. In another instance, the different timing point connected to the selected editing start timing point of the previously recorded part may include a timing point at which the timing point indicator 802 is selected. In a further instance, the different timing point connected to the selected editing start timing point of the previously recorded part may include a timing point at which the auxiliary editing region 702 is initially output. In addition, the recording by overwriting means an operation of saving a newly recorded video in a data region supposed to be removed.

Next, a second embodiment of the present invention is described with reference to FIG. 9 and FIG. 10. In particular, FIG. 9 is a flowchart and FIG. 10A, FIG. 10B and FIG. 10C are diagrams illustrating a controlling method of editing a previously recorded video according to a second embodiment of the present invention.

First, when a video is recorded, the user may want to record a video after a specific timing point. For instance, a user may want to start a recording from a specific event triggered timing point or a specific character appearing timing point. However, if a recording is started by pressing a recording start button at the specific moment, a timing point of starting the recording may be somewhat delayed. Therefore, according to one embodiment of the present invention, the following process is provided. First, a recording has started before a desired recording start timing point approaches, and secondly, a video part recorded before a timing point selected by a user is erased from a previously recorded part and a video recorded after the user selected timing point is saved.

For instance, assume that a parent wants to record a video of a school play including their child. Particularly, in recording the school play using the mobile terminal 100, the parent wants to save the video having the parent's child appear therein only without appearance of other children. In this situation, if the parent confirms the appearance of their child and then starts to record a video, a scene corresponding to the moment of the initial appearance of the child may be missed. Therefore, according to one embodiment of the present invention, a video before a specific timing point is not saved while continuing the recording before an appearance.

Figure 10A:
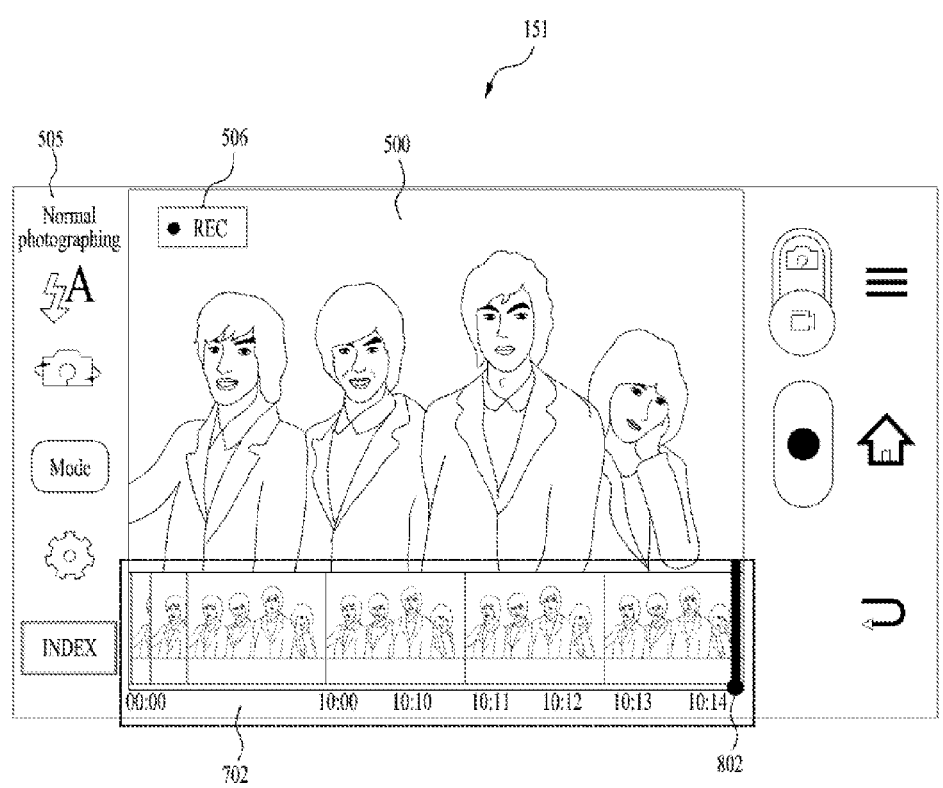

Referring to FIGS. 9 to 10C, the controller 180 records a video received through the camera 121 (S901). In a step S902, referring to FIG. 10A, the controller 180 outputs a preview screen 500 included in a recording screen 505. In addition, the controller 180 can display a recording indicator 506 indicating that a recording is in progress together with the preview screen 500.

Further, the controller 180 outputs an auxiliary editing region 702 (S903). As the auxiliary editing region 702 is similar as described with reference to FIGS. 7A to 8B, its redundant details are omitted from the following description. In addition, the controller 180 receives an input for selecting a recording timing point on the output auxiliary editing region 702 from a user (S904). Further, the selection of the recording timing point may be similar to those selection methods described with reference to FIGS. 7A to 7D. An input for selecting a recording start point may include an input performed by applying a touch 10d to the timing point indicator 802 and then applying a drag 10e by maintaining the touch 10d (FIG. 10B).

Figure 10B:
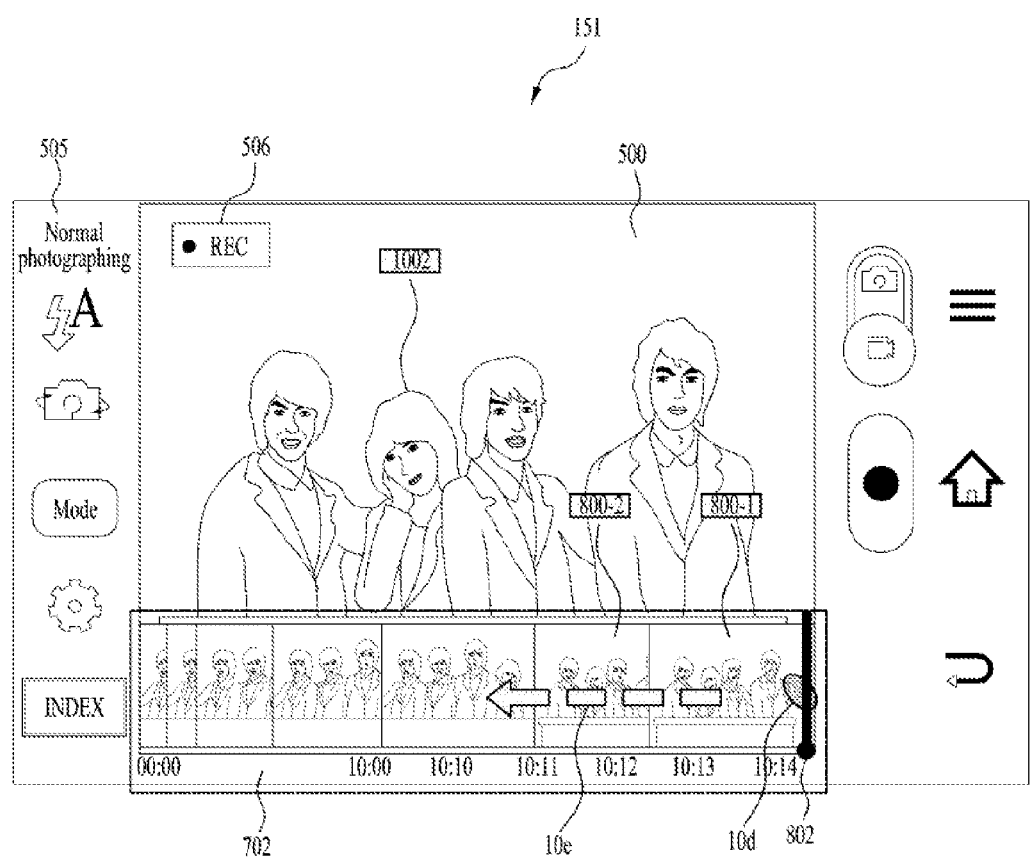

Referring to FIG. 10B, a specific character 1002 desired by a user is currently recorded. Looking into the auxiliary editing region 702, it can be observed that the specific character 1002 is included in two thumbnail images 800-1 and 800-2. In particular, the user may want to delete the video before the appearance of the specific character 1002 from a previously recorded part. Hence, the user can input a timing point, at which the specific character 1002 appears in a currently recorded video, as a recording start timing point. In addition, the user can select the recording start timing point before a position at which the second thumbnail image 800-2 is displayed. In particular, the user can apply the drag 10e to shift the position of the timing point indicator 802 to a left side of the second thumbnail image 800-2.

Further, if the input performed by applying the touch 10d to the timing point indicator 802 and then applying the drag 10e by maintaining the touch 10d or the input for shifting the position of the timing point indicator 802 is located on a specific thumbnail image, the controller 180 switches the preview screen 500 to a screen corresponding to the specific thumbnail image and can then display the corresponding screen.

FIG. 10C shows a configuration after the timing point indicator 802 has been shifted by the touch 10d and the drag 10e. Referring to FIG. 10C, the controller 180 can control left thumbnail images on the left side of the timing point indicator 802 to be displayed identifiably 1001. The reason for this is that the region on the left side of the timing point indicator 802 corresponds to a part to be deleted.

In a step S904, if an editing start timing point is not received, the controller 180 can return to the step S902. In the step S904, if the editing start timing point is received, the controller 180 can go to a step S905. In the step S905, the controller 180 can delete the video before the selected recording start timing point from the previously recorded part. In particular, the controller 180 can control the video of the previously recorded part after the selected recording start timing point and the continuously recorded video to be saved together.

So far, the second embodiment of the present invention is described with reference to FIGS. 9 to 10C. In the following description, a third embodiment of the present invention is explained in detail with reference to FIG. 11. In particular, FIG. 11 is a diagram illustrating a controlling method of saving a prescribed video section separately on recording according to a third embodiment of the present invention.

Figure 11:
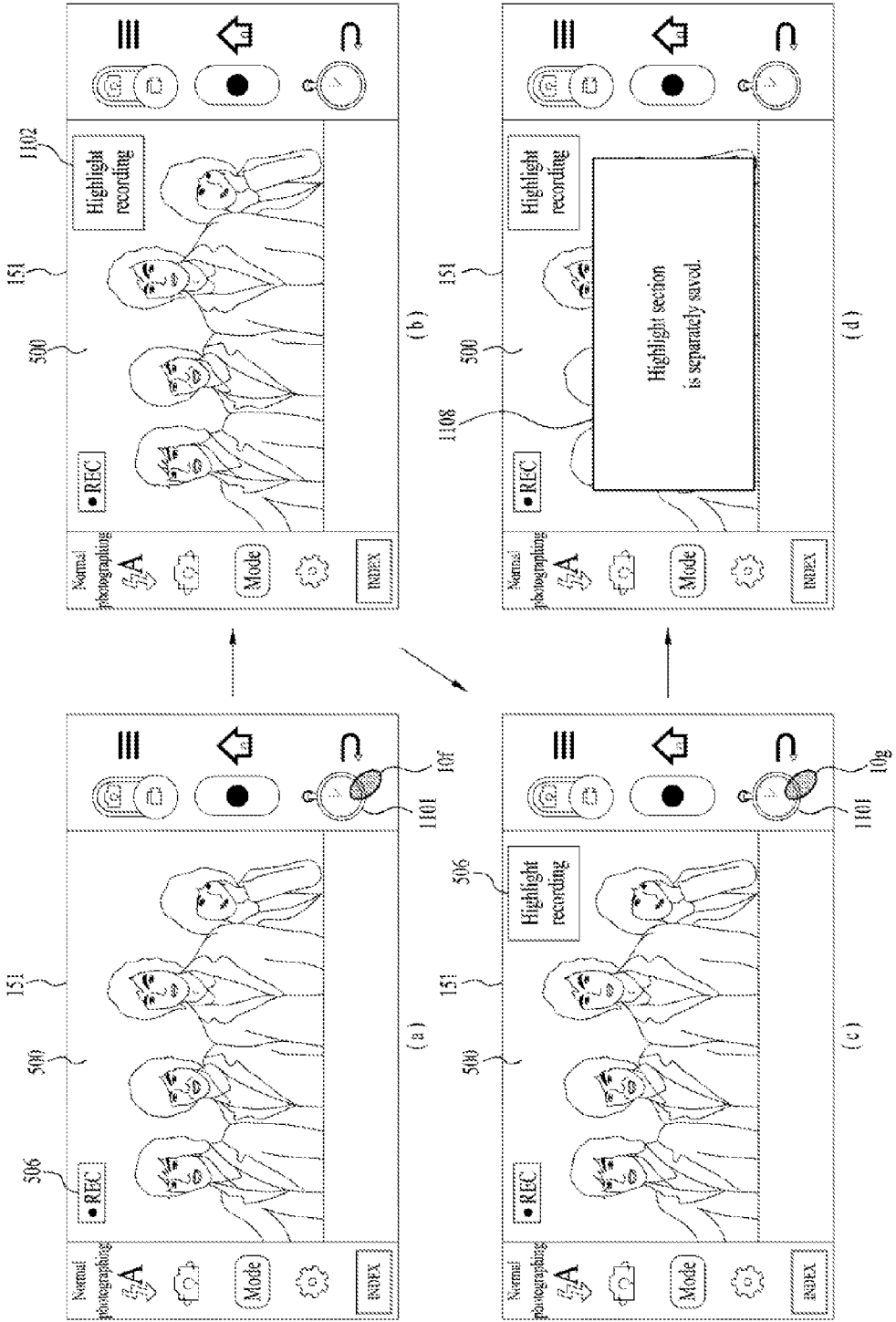
FIG. 11 is a diagram illustrating a controlling method of saving a prescribed video section separately on recording according to a third embodiment of the present invention.

Referring to FIG. 11 (*a*), the controller 180 currently outputs a preview screen 500 and a recording indicator 506 indicating that a recording is in progress together with the preview screen 500. According to the third embodiment, the present invention provides that a video for a partial section is saved separately during recording of a video. In particular, according to one embodiment of the present invention, the separately saved partial section is named a highlight section.

While a user is recording a video, the user may want to save a specific scene separately. For instance, while a video of a school play in which a child appears is recorded, a user may want to separately save a specific section in which the child plays an important role. Hence, according to one embodiment of the present invention, if start and end points of the highlight section are input by a user, the highlight section is saved separately.

According to one embodiment of the present invention, a separately saving operation may include one of: an operation (1) of creating two files; and an operation (2) of saving a start timing point information and an end timing point information. According to the operation (1), a first video file for a full recorded video and a second video file for a highlight section can be created and saved. According to the operation (2), a file for a full recorded video is created only but start and end timing point information on a highlight section are separately saved.

While a video is recorded (FIG. 11 (*a*)), if a prescribed input is received, the controller 180 can set a timing point of the reception of the prescribed input as a start timing point of a highlight section. In this instance, the prescribed input may include an input of applying a touch 10f to a highlight object 1101. If a start point of the highlight section is input, the controller 180 can further output an indicator 1102 indicating that the highlight section is currently recorded together (FIG. 11 (*b*)).

Once the start timing point of the highlight section is set, the controller 180 can control a video for the highlight section to be saved separately. While the video is recorded (FIG. 11 (*c*)), if a prescribed input is received, the controller 180 can set a timing point of the reception of the prescribed input as an end timing point of the highlight section. Once the end timing point of the highlight section is set, the controller 180 saves a video for the highlight section and can display a popup window 1103, which indicates the saving completion (FIG. 11 (*d*)).

An editing operation of cutting or pasting a video for a previously recorded video part during a recording is described above. In the following description, an operation of pasting a prescribed content on a previously recorded video part is explained in detail with reference to FIG. 12. In particular, FIG. 12 is a diagram illustrating a controlling method of editing a video part previously recorded on recording according to a fourth embodiment of the present invention.

According to a fourth embodiment of the present invention, a controlling method for inserting a prescribed content in a previously recorded video part during a recording is described in detail with reference to FIG. 12. In this instance, the prescribed content may include at least one of a memo (text), a web content, an image and a sound. The prescribed content may include a content saved in a different application or a content readable using a different application.

The first to fourth embodiments of the preset invention mentioned in the foregoing description may be implemented individually. Moreover, a plurality of the embodiments can be implemented by being combined with each other.

Figure 12:
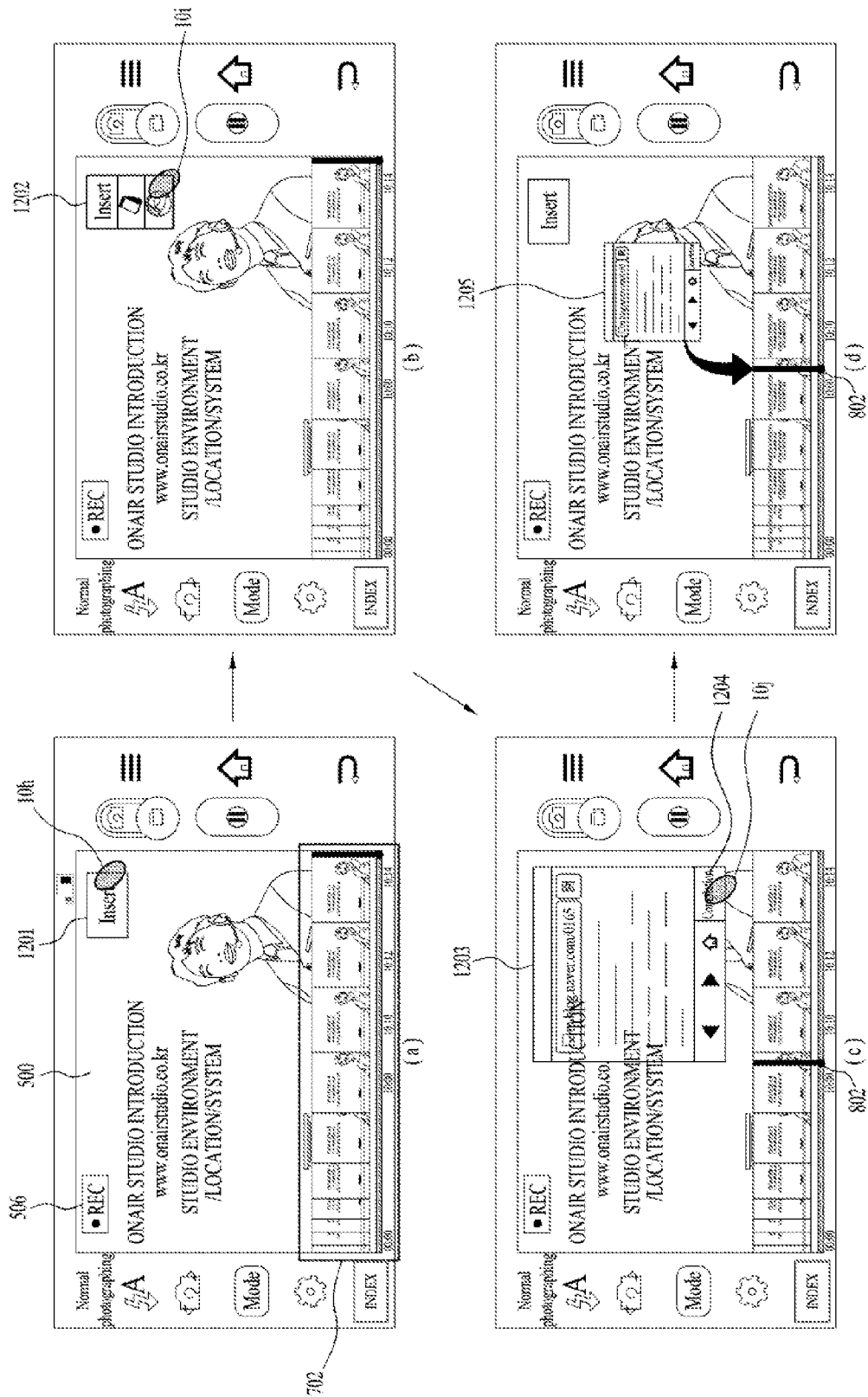
FIG. 12 is a diagram illustrating a controlling method of editing a video part previously recorded on recording according to a fourth embodiment of the present invention.

Referring to FIG. 12 (*a*), a user currently records a prescribed video using the mobile terminal 100. In addition, a recording state diagram is currently output through the touchscreen 151. In this instance, the recording state diagram can be displayed together with the aforementioned preview screen 500, the aforementioned auxiliary editing region 702 and the aforementioned recording indicator 506. On the preview screen 500 of the fourth embodiment of the present invention, a content insertion object 1201 can be displayed together.

If a content insertion command is received in the state shown in FIG. 12 (*a*), the controller 180 can output a list 1202 of prescribed applications (FIG. 12 (b)). As one example of the content insertion command, there is an input of applying a touch 10h to the content insertion object 1201. If an input 10i of selecting a prescribed application from the application list is received, referring to FIG. 12 (c), the controller 180 can output a popup window 1203 for reading a prescribed content using the selected application.

While the prescribed content is displayed, as shown in FIG. 12 (c), if a prescribed timing point is selected through the auxiliary editing region 702 and a command for inserting a prescribed content in the selected prescribed timing point is received, the controller 180 can save the prescribed content to correspond to the selected prescribed timing point. In this instance, the action of saving the prescribed content to correspond to the prescribed timing content may mean that the prescribed content is displayed together when the prescribed timing point of the recorded video is played.

In FIG. 12 (c), the input for selecting the timing point for inserting the content may include an input of shifting the timing point indicator 802 in the auxiliary editing region 702 to a prescribed point on the time axis 801. In addition, a corresponding shift controlling method may be identical to that described with reference to FIG. 7C. The controller 180 can insert the prescribed content to correspond to the prescribed point to which the timing point indicator 802 is shifted. Hence, after the timing point indicator 802 has been shifted to the prescribed point on the time axis 801, if a user applies a touch 10j to a complete button, the controller 180 can save the prescribed content to correspond to the prescribed point.

In saving the prescribed content, the controller 180 can control an animation effect 1205, which is implemented as if the displayed popup window 1203 enters the prescribed point indicated by the timing point indicator 802 on the time axis 801, to be further displayed (FIG. 12 (d)). When the first to fourth embodiments of the present invention mentioned in the foregoing description are implemented, a user may want to mark a prescribed point on a time axis for a later editing. For instance, if an NG situation occurs suddenly during a recording, a corresponding timing point is marked on a time axis so as to be referred to in editing. Such an embodiment is described in detail with reference to FIG. 13 as follows.

FIG. 13 is a diagram illustrating a controlling method of displaying an index timing point at a prescribed point on a time axis according to one embodiment of the present invention. Referring to FIG. 13 (a), a state diagram of a recording screen is currently illustrated. The mobile terminal 100 can output a preview screen 500 and a recording indicator 506 through the touchscreen 151.

According to the embodiment described with reference to FIG. 13, a controlling method of displaying a specific timing point designated by a user on a time axis 801. For instance, assume that a specific obstacle 1301 interrupts a recorded scene of a video. In this instance, a user may intend to edit the video by deleting a scene in which the corresponding obstacle 1301 appears. Hence, according to one embodiment of the present invention, if a user selects the specific timing point, an index corresponding to the timing point is displayed on the time axis 801.

If a command for displaying a specific timing point is input by a user, the controller 180 outputs an auxiliary editing region 702 including a time axis 801 and a plurality of thumbnail images and can display an index 1302 at a corresponding position on the output time axis 801. According to one embodiment of the present invention, referring to FIG. 13 (c), the displayed index 1302 can include a preview thumbnail image for a corresponding timing point. In addition, according to one embodiment of the present invention, thumbnail images, which are displayed on the right side region of the index 1302, among a plurality of the displayed thumbnail images can be identifiably displayed 1303.

Moreover, according to one embodiment, the present invention directly performs an editing in response to an editing command received after displaying the index 1302. In particular, if an editing command is received after the index 1302 has been displayed, the controller 180 can perform a recording in continuation with a timing point, at which the index 1302 was received, of a previously recorded part by overwriting. As one example of the editing command, there may be an input of applying a touch 10k to the identifiably displayed thumbnail image.

Accordingly, embodiments of the present invention provide several advantages. For example, a recorded video can be edited while recording with the mobile terminal.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). In addition, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a camera;
a touchscreen; and
a controller configured to:
start a recording of a video through the camera while a preview screen of the camera is displayed,
display an editing region on the preview screen of the camera including a time axis for a previously recorded part of the video and a plurality of thumbnail images listed on the time axis,
receive an input of selecting a first point in the editing region for selecting a first portion of the previously recorded part of the video while the video is currently being recorded, and
overwrite the first portion of the previously recorded part of the video with another portion of the video currently being recorded.
2. The mobile terminal of claim 1, wherein the controller is further configured to:
begin overwriting the first portion of the previously recorded part of the video at a timing point behind the first point.
3. The mobile terminal of claim 1, wherein the controller is further configured to:
display a timing point indicator on the editing region to correspond with a current position of the video currently being recorded.
4. The mobile terminal of claim 3, wherein the input of selecting the first point in the editing region includes a touching and dragging of the timing point indicator from the current position to the first point in the editing region.

5. The mobile terminal of claim 1, wherein a width of a corresponding thumbnail increases from the start of the recording to a current position of the recording.

6. The mobile terminal of claim 1, wherein a time interval between adjacent thumbnail images increases from a current position of the recording to the start of the recording.

7. The mobile terminal of claim 1, wherein the controller is further configured to:
display the editing region on the video currently being recorded in response to a touch input on a lower portion of the touchscreen.

8. The mobile terminal of claim 1, wherein the controller is further configured to:
highlight thumbnail images that are going to be overwritten with the video currently being recorded.

9. The mobile terminal of claim 1, wherein the controller is further configured to:
display adjacent thumbnails listed on the time axis with at least two different time intervals.

10. A method of controlling a mobile terminal, the method comprising:
start a recording of a video through a camera of the mobile terminal;
displaying, via a touchscreen of the mobile terminal, an editing region on a preview screen of the camera including a time axis for a previously recorded part of the video and a plurality of thumbnail images listed on the time axis;
receiving, via a controller of the mobile terminal, an input of selecting a first point in the editing region for selecting a first portion of the previously recorded part of the video while the video is currently being recorded; and
overwriting, via the controller, the first portion of the previously recorded part with another portion of the video currently being recorded.

11. The method of claim 10, further comprising:
begin overwriting the first portion of the previously recorded part of the video at a timing point behind the first point.

12. The method of claim 10, further comprising:
displaying a timing point indicator on the editing region to correspond with a current position of the video currently being recorded,
wherein the input of selecting the first point in the editing region includes a touching and dragging of the timing point indicator from the current position to the first point in the editing region.

13. The method of claim 10, wherein a width of a corresponding thumbnail increases from the start of the recording to a current position of the recording.

14. The method of claim 10, wherein a time interval between adjacent thumbnail images increases from a current position of the recording to the start of the recording.

15. The method of claim 10, further comprising:
displaying the editing region on the video currently being recorded in response to a touch input on a lower portion of the touchscreen.

16. The method of claim 10, further comprising:
highlighting thumbnail images that are going to be overwritten with the video currently being recorded.

17. The method of claim 10, further comprising:
displaying adjacent thumbnails listed on the time axis with at least two different time intervals.

* * * * *